United States Patent
McElroy et al.

(10) Patent No.: US 7,201,979 B2
(45) Date of Patent: *Apr. 10, 2007

(54) SORFC SYSTEM AND METHOD WITH AN EXOTHERMIC NET ELECTROLYSIS REACTION

(75) Inventors: James Frederick McElroy, Suffield, CT (US); John E. Finn, Mountain View, CA (US)

(73) Assignee: Bloom Energy Corporation, Sunnyvale, CA (US)

(*) Notice: Subject to any disclaimer, the term of this patent is extended or adjusted under 35 U.S.C. 154(b) by 546 days.

This patent is subject to a terminal disclaimer.

(21) Appl. No.: 10/465,636

(22) Filed: Jun. 20, 2003

(65) Prior Publication Data
US 2004/0191595 A1    Sep. 30, 2004

Related U.S. Application Data

(63) Continuation-in-part of application No. 10/394,202, filed on Mar. 24, 2003, now Pat. No. 7,045,238.

(51) Int. Cl.
*H01M 8/00* (2006.01)
*C25B 1/00* (2006.01)

(52) U.S. Cl. .................. 429/13; 429/17; 429/21; 205/343

(58) Field of Classification Search ........... 429/17, 429/13, 21, 26, 30, 19; 205/343, 412
See application file for complete search history.

(56) References Cited

U.S. PATENT DOCUMENTS

| | | | |
|---|---|---|---|
| 4,041,210 A | 8/1977 | Van Dine | |
| 4,182,795 A | 1/1980 | Baker et al. | |
| 4,452,676 A | 6/1984 | Birbara et al. | |
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,143,800 A | 9/1992 | George et al. | |
| 5,169,730 A | 12/1992 | Reichner et al. | |
| 5,170,124 A | 12/1992 | Blair et al. | |
| 5,302,470 A | 4/1994 | Okada et al. | |
| 5,441,821 A | 8/1995 | Merritt et al. | |
| 5,498,487 A | 3/1996 | Ruka et al. | |
| 5,501,914 A | 3/1996 | Satake et al. | |

(Continued)

OTHER PUBLICATIONS

"High Temperature Electrolysis of Steam and Carbon Dioxide", Soren Hojgaard Jensen et al., from Proceedings of Riso International Energy Conference, held at Riso National Laboratory, Denmark, May 19-21, 2003, Riso-R-1405(CN), pp. 204-215, L.S. Peterson and H. Jensen, eds.

(Continued)

*Primary Examiner*—Raymond Alejandro
(74) *Attorney, Agent, or Firm*—Foley & Lardner LLP

(57) ABSTRACT

A solid oxide regenerative fuel cell system is used to supply power in a fuel cell mode and to generate a hydrocarbon fuel in an electrolysis mode. The system includes a solid oxide regenerative fuel cell and a reactor adapted to convert an exhaust emitted from the solid oxide regenerative fuel cell to a hydrocarbon gas when the solid oxide regenerative fuel cell operates in an electrolysis mode.

13 Claims, 6 Drawing Sheets

U.S. PATENT DOCUMENTS

| | | | |
|---|---|---|---|
| 5,505,824 | A | 4/1996 | McElroy |
| 5,518,829 | A | 5/1996 | Satake et al. |
| 5,527,631 | A | 6/1996 | Singh et al. |
| 5,573,867 | A | 11/1996 | Zafred et al. |
| 5,601,937 | A | 2/1997 | Isenberg |
| 5,733,675 | A | 3/1998 | Dederer et al. |
| 5,741,605 | A | 4/1998 | Gillett et al. |
| 6,013,385 | A | 1/2000 | DuBose |
| 6,051,125 | A | 4/2000 | Pham et al. |
| 6,106,966 | A | 8/2000 | Crow |
| 6,280,865 | B1 | 8/2001 | Eisman et al. |
| 6,329,090 | B1 | 12/2001 | McElroy et al. |
| 6,403,245 | B1 | 6/2002 | Hunt |
| 6,436,562 | B1 | 8/2002 | DuBose |
| 6,511,017 | B2 | 1/2003 | Kirjavainen |
| 6,520,273 | B1 | 2/2003 | Ishikawa |
| 6,531,243 | B2 | 3/2003 | Thom |
| 6,572,996 | B1 | 6/2003 | Isenberg et al. |
| 6,821,663 | B2 * | 11/2004 | McElroy et al. ............ 429/17 |
| 7,045,238 | B2 | 5/2006 | Gottmann et al. |
| 2002/0058175 | A1 * | 5/2002 | Ruhl ......................... 429/32 |
| 2003/0031901 | A1 | 2/2003 | Breuer et al. |
| 2004/0081859 | A1 * | 4/2004 | McElroy et al. ............. 429/1 |
| 2004/0224193 | A1 * | 11/2004 | Mitlitsky et al. ........... 429/13 |
| 2005/0048334 | A1 * | 3/2005 | Sridhar et al. .............. 429/21 |
| 2005/0053812 | A1 * | 3/2005 | Hickey et al. .............. 429/21 |

OTHER PUBLICATIONS

U.S. Appl. No. 2003/0162067 A1, filed Aug. 28, 2003.

Cell and Stack Construction: Low-Temperature Cells, L.G. Austin, NASA SP-120, 1967.

Low Cost, High Efficiency Reversible Fuel Cell Systems, Proceedings of the 2002 U.S. DOE Hydrogen Program Review, NREL/CP-610-32405.

Low Cost Reversible Fuel Cell System, Proceedings of the 2000 U.S. DOE Hydrogen Program Review, Jun. 15, 2000, NREL/CP-570-28890.

Low Cost, Compact Solid Oxide Fuel Cell Generator, NASA Small Business Innovation Research Program.

Small, Ultra Efficient Fuel Systems, Advanced Technology Program ATP 2001 Competition (Jun. 2002).

Low Cost, High Efficiency Reversible Fuel Cell (and Electrolyzer) Systems, Proceedings of the 2001 DOE Hydrogen Program Review NREL/CP-570-30535.

Regenerative Fuel Cells for High Altitude Long Endurance Solar Powered Aircraft, F. Mitlitsky, et al, 28th Intersociety Energy Conversion Engineering Conference (IECEC), Jul. 28, 1993, UCRL-JC-113485.

Unitized Regenerative Fuel Cells for Solar Rechargeable Aircraft and Zero Emission Vehicles, F. Mitlitsky, et al, 1994 Fuel Cell Seminar, Sep. 6, 1994, UCRL-JC-117130.

www.synetix.com/methanol/pdfs/general/shortlpm.pdf Synetix Low Pressure Methanol (LPM) Process.

U.S. Appl. No. 11/432,503, filed May 12, 2006, Gottmann et al.

* cited by examiner

SORFC SYSTEM AND METHOD WITH AN EXOTHERMIC NET ELECTROLYSIS REACTION

This application is a continuation-in-part of U.S. application Ser. No. 10/394,202 filed on Mar. 24, 2003, now U.S. Pat. No. 7,045,238, which is incorporated by reference in its entirety.

BACKGROUND OF THE INVENTION

The present invention is generally directed to Solid Oxide Fuel Cells (SOFC's), and more specifically to reversible SOFC's referred to as Solid Oxide Regenerative Fuel Cells (SORFC's).

The overall potential efficiency of the SORFC is restrained by a charging voltage for very high efficiency which is below the thermal neutral voltage. This means that heat must be added to the SORFC operating in the charge or electrolysis mode in order to keep it at operational temperature to operate at these voltage levels.

There is an abundance of extra heat generated during the SORFC discharge or fuel cell mode. One method of obtaining a high SORFC round trip efficiency is to store the extra heat produced in the discharge mode and use that heat to maintain the system temperature during the charge mode. This requires an appropriate high heat capacity material to accomplish adequate heat storage. Such a heat storage system is appropriate for a very high efficiency SORFC based on a water cycle. In such a cycle, water is electrolyzed during the charge or electrolysis mode with the product hydrogen stored and the product oxygen discharged to ambient. During the discharge or fuel cell mode of the SORFC based on the water cycle, the hydrogen and oxygen from air are reacted to produce power and water. However, the heat storage material increases system mass and complexity, which may be disadvantageous for certain applications.

SUMMARY OF THE INVENTION

A preferred embodiment of the present invention provides a solid oxide regenerative fuel cell system, comprising a solid oxide regenerative fuel cell, and a reactor adapted to convert an exhaust emitted from the solid oxide regenerative fuel cell to a hydrocarbon gas when the solid oxide regenerative fuel cell operates in an electrolysis mode.

Another preferred embodiment of the present invention provides a solid oxide regenerative fuel cell system, comprising a solid oxide regenerative fuel cell, and a Sabatier reactor adapted to convert hydrogen and carbon monoxide emitted from the solid oxide regenerative fuel cell to methane and water vapor when the solid oxide regenerative fuel cell operates in an electrolysis mode.

Another preferred embodiment of the present invention provides a solid oxide regenerative fuel cell system, comprising a solid oxide regenerative fuel cell, and a means for converting an exhaust emitted from the solid oxide regenerative fuel cell to a hydrocarbon gas when the solid oxide regenerative fuel cell operates in an electrolysis mode.

Another preferred embodiment of the present invention provides a method of operating a solid oxide regenerative fuel cell system, comprising operating the solid oxide regenerative fuel cell system in a fuel cell mode to generate power, and operating the solid oxide regenerative fuel cell system in an electrolysis mode to generate oxygen and a hydrocarbon fuel.

Another preferred embodiment of the present invention provides a method of operating a solid oxide regenerative fuel cell system, comprising providing an inlet gas stream into a solid oxide regenerative fuel cell operating in an electrolysis mode, providing an exhaust gas stream from the solid oxide regenerative fuel cell into a reactor, converting the exhaust gas emitted from the solid oxide regenerative fuel cell to a hydrocarbon gas in an exothermic reaction, and transferring heat from an exothermic reaction to the inlet gas stream.

DETAILED DESCRIPTION OF THE PREFERRED EMBODIMENTS

Figure 1:
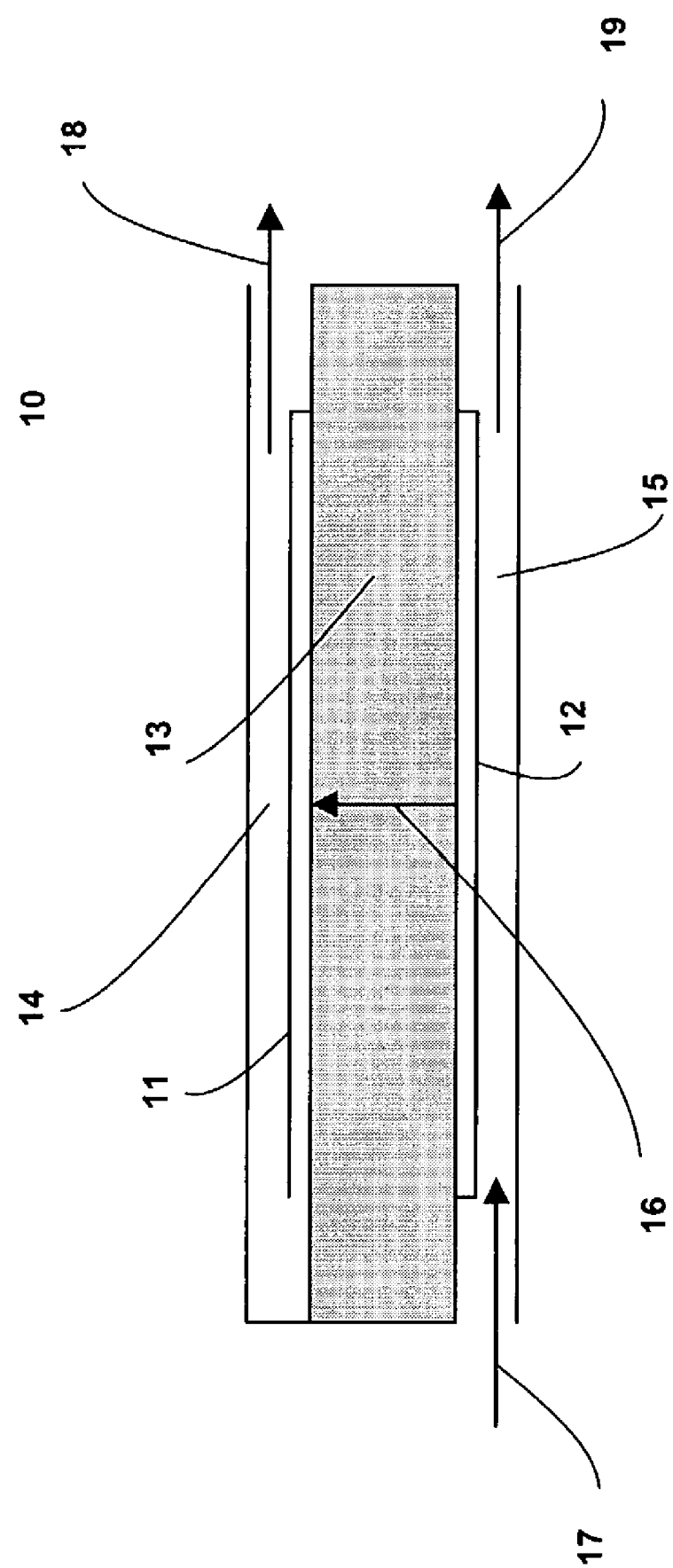
FIG. 1 is a schematic cross section of a single SORFC operating in the electrolysis mode according to a preferred embodiment of the present invention.

The present inventors have realized that a SORFC system based on a hydrocarbon cycle, such as a methane or methanol cycle, can "store heat" by the conversion of hydrogen to a hydrocarbon as part of the electrolysis or charge mode and by the conversion of the hydrocarbon to hydrogen as part of the fuel cell or discharge mode. Thus, heat produced during SORFC fuel cell or discharge mode is "transferred" to the SORFC during the electrolysis or charge mode by changing the species of the stored products.

The SORFC system comprises an SORFC, such as a SORFC stack, and a reactor which converts the exhaust emitted from the SORFC in the electrolysis mode into a hydrocarbon fuel. When the SORFC system generates oxygen and a hydrocarbon fuel from carbon dioxide and water vapor in the electrolysis mode while power is applied to the SORFC, the net electrolysis reaction is exothermic. In the net electrolysis reaction, carbon dioxide and water vapor are provided into the SORFC and a hydrogen and carbon monoxide containing exhaust gas is emitted from the SORFC into the reactor. The exhaust gas is converted to a hydrocarbon gas and other gases, such as water, in an exothermic reaction in the reactor.

The heat from the exothermic reaction is used to heat the SORFC to a desired operating temperature. For example, the inlet gas stream, such as carbon dioxide and water vapor inlet gas stream, being provided into the SORFC may be passed through a heat exchanger in the reactor or adjacent to the reactor to raise the inlet gas stream temperature. However, other suitable heat transfer methods may also be used.

The heated carbon dioxide and water vapor are then provided into the SORFC to maintain the SORFC at a desired operating temperature.

The heat generated by the exothermic hydrocarbon generation reaction in the electrolysis mode is sufficient to maintain the SORFC at a proper operating temperature to conduct the carbon dioxide and water electrolysis reactions. Therefore, preferably no external heat is used to operate the SORFC in the electrolysis mode at a high efficiency. Furthermore, preferably no heat storage material is used to store heat generated in the fuel cell mode and to transfer the stored heat to the SORFC in the electrolysis mode. Preferably but not necessarily, the SORFC system (i.e., the SORFC and the reactor) is operated to sustain the SORFC at a desired temperature by heat transfer from the reactor to the SORFC without generating substantial excess heat in the reactor (i.e. without generating more than 5–10% excess heat).

The preferred hydrocarbon fuel comprises methane and the preferred reactor comprises a Sabatier reactor. The Sabatier reactor converts the exhaust stream containing hydrogen and carbon monoxide emitted from SORFC to methane and water vapor when the SORFC operates in the electrolysis mode. However, other hydrocarbon fuels and other suitable reactors may also be used. For example, a fuel such as methanol and a reactor which converts carbon monoxide and hydrogen to methanol may also be used.

In the fuel cell mode, the methane fuel is delivered to the SORFC anode where it is reformed into hydrogen and carbon monoxide, while oxygen or air containing oxygen is delivered to the SORFC cathode. In the fuel cell mode reaction, the hydrogen and carbon monoxide are converted to water and carbon dioxide which are discharged from the SORFC and preferably stored. Because the reformation of methane during the discharge cycle is highly endothermic, only about half of the heat is generated in the overall system as would have been produced using a hydrogen fuel input. The SORFC generates power during the fuel cell mode.

In the SORFC electrolysis mode of the methane cycle, the stored water and carbon dioxide are electrolyzed to form hydrogen and carbon monoxide. The hydrogen and carbon monoxide gases are then reacted in a Sabatier reactor in a highly exothermic Sabatier reaction to produce methane and a quantity of waste heat essentially equivalent to the heat deficiency resulting from the methane reforming reaction during the fuel cell mode. This extra overall heat generated during SORFC electrolysis or charge mode allows the cell voltages to be significantly lower while still providing sufficient heat to maintain the SORFC cells at a desired temperature.

In a preferred aspect of the present invention, the methane generated in the electrolysis mode by the SORFC and the Sabatier reactor is provided to and stored in a methane fuel source, such as a methane storage vessel. The methane is then subsequently provided into the SORFC from the methane fuel source when the SORFC operates in the fuel cell mode. The water and carbon dioxide generated during the fuel cell mode are also preferably stored and then provided into the SORFC in the electrolysis mode.

In another preferred aspect of the present invention, one or more of a hydrocarbon fuel, such as methane, water vapor and carbon dioxide generated in one operating mode of the SORFC are not stored for reuse in the other SORFC mode, but are removed from the SORFC system for outside storage or use.

For example, the hydrocarbon fuel, such as methane, generated in the electrolysis mode, may be stored for sale or use outside the SORFC system or it may be provided directly to another location outside the SORFC system for use in another machine or another fuel cell, such as another SOFC or SORFC. If the hydrocarbon fuel is not reused in the SORFC in the fuel cell mode, then another fuel such as hydrogen, syngas, carbon monoxide, other hydrocarbon fuels and/or mixtures of these and other suitable fuels may be used as fuel for the SORFC in the fuel cell mode. Alternatively, methane fuel is provided to the SORFC in the fuel cell mode from outside the SORFC system, such as from a methane conduit, storage vessel or from another SORFC operating in an electrolysis mode.

Likewise, water and/or carbon dioxide generated during the fuel cell mode may be discharged into a drain and/or into the atmosphere or provided for use or storage outside the SORFC system. During the electrolysis mode, the water and/or carbon dioxide are provided into the SORFC from outside the SORFC system, such as from water and/or carbon dioxide storage vessels or conduits (i.e., such as a water pipe).

Many advantages accrue from the SORFC system's electrolyzation of not only water but carbon dioxide as well in an electrolysis mode. These advantages include generating a hydrocarbon fuel in addition to oxygen, converting hydrogen and carbon monoxide byproducts into useful storable hydrocarbon fuel and excess heat which sustains the electrolysis reaction in the SORFC, consumption of accumulated carbon dioxide, and enhancing the overall efficiency of the process. For example, the hydrocarbon fuel may be a methane fuel, a mixture of methane and other fuels or hydrocarbon fuels other than methane. Preferably, the stored volumes of all the accumulated fluids (e.g. oxygen, carbon dioxide, and methane) are minimized by liquefaction using a primary electrical energy source (i.e., a source other than the SORFC) or by using the power generated by the SORFC. Carbon dioxide may also be liquefied using the heat for vaporizing of the oxygen and methane. Alternatively, if desired, the reactants, such as fuel, oxygen and carbon dioxide may be stored in gas rather than liquid form.

Furthermore, formation and storage of a hydrocarbon fuel, such as methane, is sometimes preferable to formation and storage of hydrogen, because it generally takes less heat to form a hydrocarbon fuel from water and carbon dioxide than it takes to form hydrogen from electrolysis of water. Still further, a pure hydrocarbon fuel, such as pure methane, is typically formed and stored during the electrolysis mode. It is preferred, but not required, to use the stored pure hydrocarbon fuel during the electrical power generation fuel cell mode instead of an impure fuel, such as natural gas provided from a gas pipe line, because natural gas contains deleterious nitrogen and sulfur.

During electrolysis mode, the SORFC may also be operated to produce metabolic oxygen needs for a life support system or other habitable area from water and expired carbon dioxide. The byproducts, hydrogen and carbon monoxide are converted to methane and water within a Sabatier reactor. The methane is separated from the water, liquefied, if desired, and stored in a storage vessel or removed from the system for other use.

The SORFC system may be used to provide power in the fuel cell mode to any suitable object that requires power, such as a building, an appliance, a factory or a ground, air or water vehicle. The SORFC system also provides waste heat in the fuel cell and electrolysis modes, which may be used for at least one building or vehicle appliance, such as an air conditioning system, a hot water heater, a refrigeration system or a cooking appliance located in the building. If the portion of the building is permanently sealed, such as a clean room in a semiconductor plant, then the building may optionally contain two separate solid oxide regenerative fuel cell systems which continuously supply power and oxygen to the building. One fuel cell may operate in the electrolysis mode to provide oxygen to the building life support system and fuel to the second fuel cell. The second fuel cell may operate in the fuel cell mode to provide power to the building and/or to the first fuel cell using atmospheric oxygen and the fuel generated by the first fuel cell as well as additional fuel.

A single SORFC 10 operating in the electrolysis mode is shown in FIG. 1. The SORFC contains an anode electrode, an electrolyte and a cathode electrode. Anode electrode 11 is preferably a porous electrode comprising perovskites, metals and/or cermets. Preferably, the anode electrode comprises a perovskite material. Cathode electrode 12 is also preferably a porous electrode comprising platinum or platinum family metals. Preferably, the cathode electrode comprises platinum. Solid oxide electrolyte 13 is sheet of ceramic material, such as yttria stabilized zirconia. Electrodes 11 and 12 are attached to electrolyte 13. An anode gas chamber 14 is formed between the electrolyte 13 and an anode side interconnect (not shown for simplicity). A cathode gas chamber 15 is formed between the electrolyte 13 and a cathode side interconnect (also not shown for simplicity).

A gas mixture 17 containing primarily water vapor and carbon dioxide is introduced into the cathode gas chamber 15. A direct current power source (not shown) is connected to the anode electrode 11 and the cathode electrode 12 in such a way that when electrical current is flowing, the anode electrode 11 takes on a positive voltage charge and the cathode electrode 12 takes on a negative voltage charge. When the electric current is flowing, the gas mixture 17 containing primarily water vapor and carbon dioxide gives up oxygen ions 16 to form cathode discharge mixture 19 consisting primarily of hydrogen and carbon monoxide. Oxygen ions 16 transport across the electrolyte 13 under the electrical current. The oxygen ions 16 are converted into oxygen gas 18 on the anode electrode 11 under the influence of the electrical current. The oxygen gas 18 is discharged from the anode chamber 14.

Figure 2:
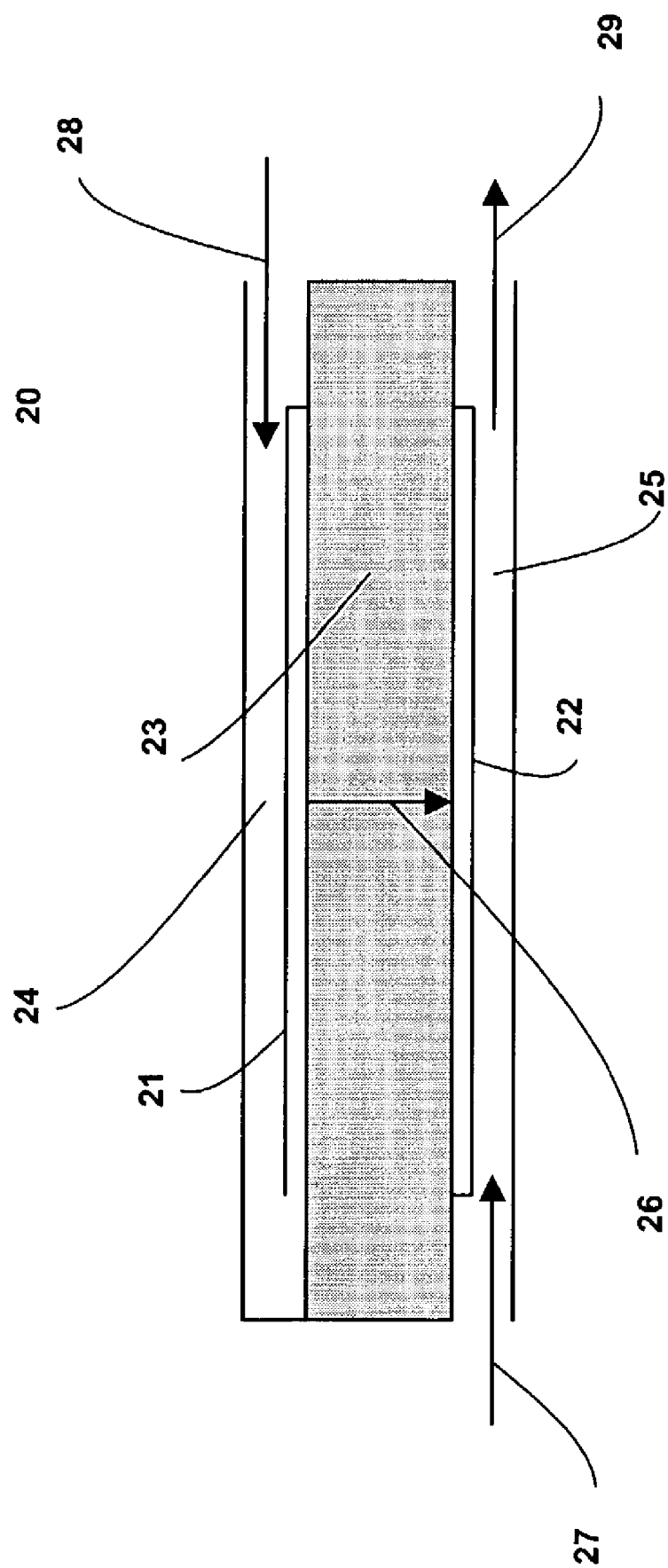
FIG. 2 is a schematic cross section of a single SORFC operating in the fuel cell mode according to a preferred embodiment of the present invention.

A single SORFC 20 operating in the fuel cell mode is shown in FIG. 2. SORFC 20 is the same as SORFC 10, except that the cathode and anode designations of its electrodes are reversed. Cathode electrode 21 is the same electrode as that identified as the anode electrode 11 in FIG. 1 when operating in the electrolysis mode. Anode electrode 22 is the same electrode as that identified as the cathode electrode 12 in FIG. 1 when operating in the electrolysis mode. Solid oxide electrolyte 23 is the same electrolyte as that identified as electrolyte 13 in FIG. 1 when operating in the electrolysis mode. Cathode gas chamber 24 is the same gas chamber as that identified as the anode gas chamber 14 in FIG. 1 when operating in the electrolysis mode. Anode gas chamber 25 is the same gas chamber as that identified as the cathode gas chamber 15 in FIG. 1 when operating in the electrolysis mode.

A gas mixture 27 containing primarily water vapor and methane is introduced into the anode gas chamber 25. Oxygen gas 28 is introduced into the cathode chamber 24. An electrical fuel cell load (not shown) is applied to the SORFC 20 and the oxygen gas 28 forms oxygen ions 26 under the influence of the electrical load. Oxygen ions 26 transport across the electrolyte 23 under the influence of the electrical current. On the anode electrode 22, the oxygen ions 26 combine with carbon and hydrogen from gas mixture 27 to form gas mixture 29 containing primarily carbon dioxide and water vapor. Gas mixture 29 is discharged from the anode chamber. In the process described above, the SORFC 20 has made electrical energy or power, which is output through its electrodes.

Figure 3:
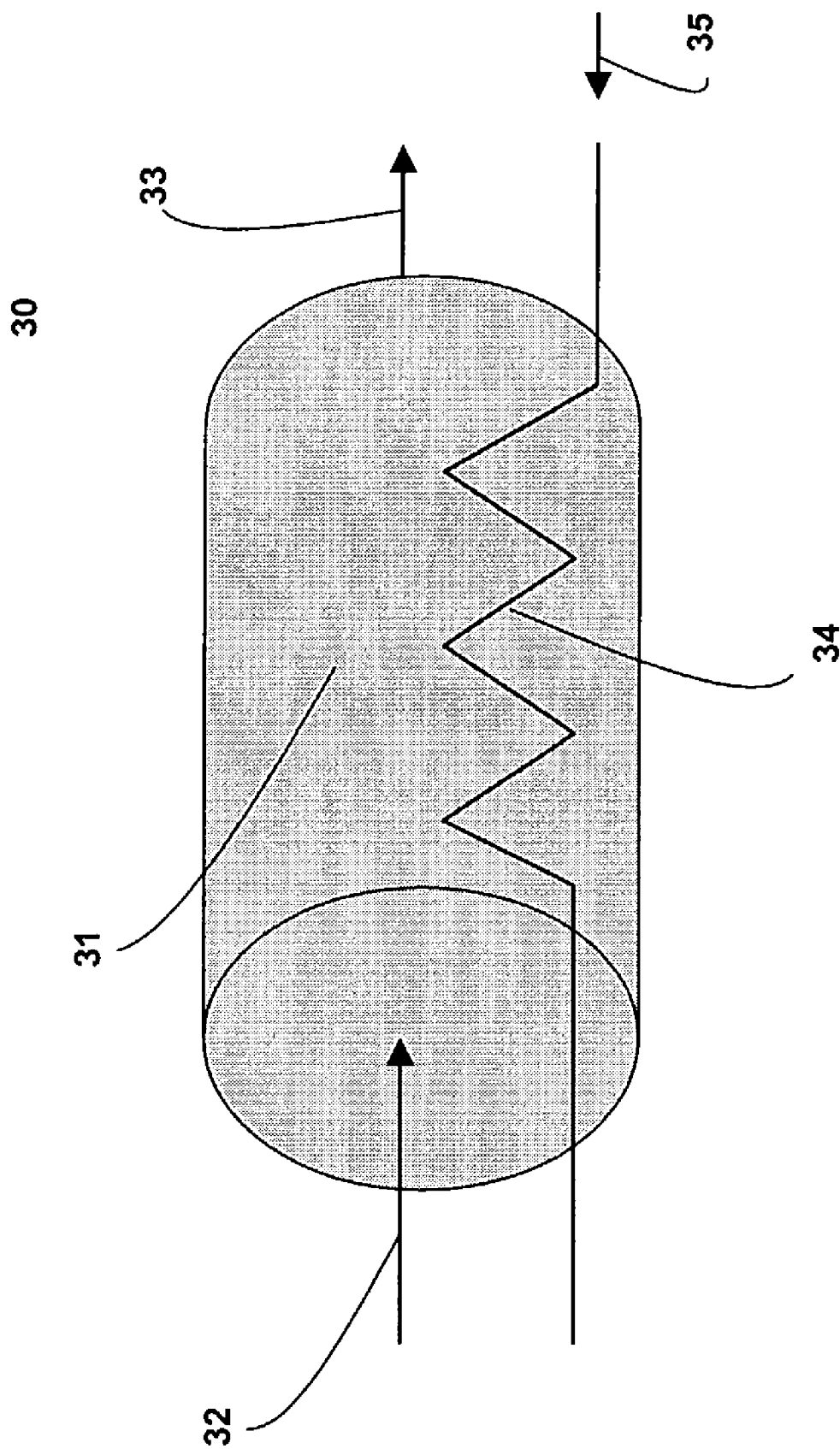
FIG. 3 is a schematic side of view of a Sabatier reactor according to a preferred embodiment of the present invention.

A Sabatier reactor subsystem 30 is shown in FIG. 3. The reactor tube 31 contains a catalyst, such as a platinum family metal on an alumina support. Preferably, the catalyst comprises ruthenium. A gas mixture 32 consisting primarily of hydrogen and carbon monoxide is introduced into reactor tube 31 and contacts the catalyst therein. The gas mixture 32 undergoes an immediate exothermic reaction and produces gas mixture 33 consisting primarily of methane and water vapor. Gas mixture 33 is then discharged from the reactor tube 31. When the Sabatier reactor is used with the SORFC 10 operating in the electrolysis mode, the hydrogen and carbon dioxide discharge mixture 19/32 is provided from the SORFC into the Sabatier reactor 30.

Because the reaction within reactor tube 31 is highly exothermic, a heat exchanger 34 located in or adjacent to tube 31 is used to capture the generated heat. Gas mixture 35, consisting primarily of carbon dioxide and water, flows through heat exchanger 34 to absorb the exothermic reaction heat. When the Sabatier reactor is used with the SORFC 10 operating in the electrolysis mode, the water vapor and carbon dioxide inlet mixture 17/35 is heated in the Sabatier reactor by the reaction of the outlet or discharge mixture 19/32. The water vapor and carbon dioxide inlet mixture 17/35 is then provided from the Sabatier reactor into the SORFC 10.

Figure 4:
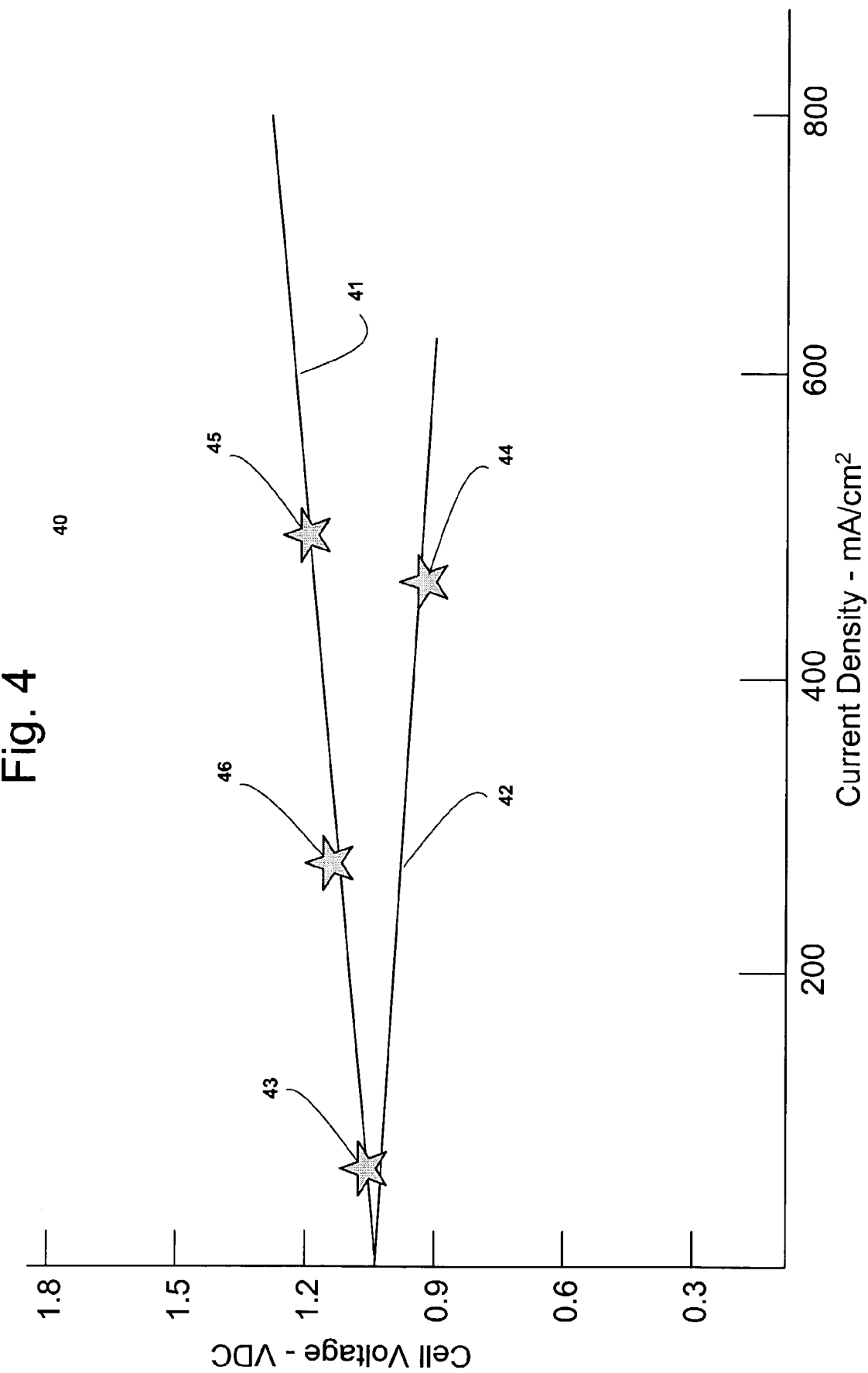
FIG. 4 is a voltage/current plot of a single SORFC cell showing the typical electrolysis and fuel cell performance according to a preferred embodiment of the present invention.

Typical solid oxide single cell electrical performance 40 is shown on FIG. 4. Electrolysis mode electrical performance 41 describes the general cell voltage-current relationship when the cell is electrolyzing a mixture of water vapor and carbon dioxide in a temperature range of 600° C. to 1000° C. Fuel cell mode electrical performance 42 describes the general cell voltage-current relationship when the cell is producing electrical power from methane and oxygen reactants operating in a temperature range of 600° C. to 1000° C. Fuel cell operating point 44 is an example of a high current density performance level commensurate with providing all the required electrical power. Electrolysis operating point 43 is an example of a low current density performance level commensurate with the cell just providing oxygen, such as metabolic oxygen for example. Electrolysis operating point 45 is an example of a high current density performance level commensurate with providing oxygen and recharging the fuel cell reactants at the same rate they were consumed while in the fuel cell mode. Electrolysis operating point 46 is an example of an intermediate current density performance level commensurate with providing oxygen and recharging the fuel cell reactants at half the rate they were consumed while in the fuel cell mode.

Figure 5:
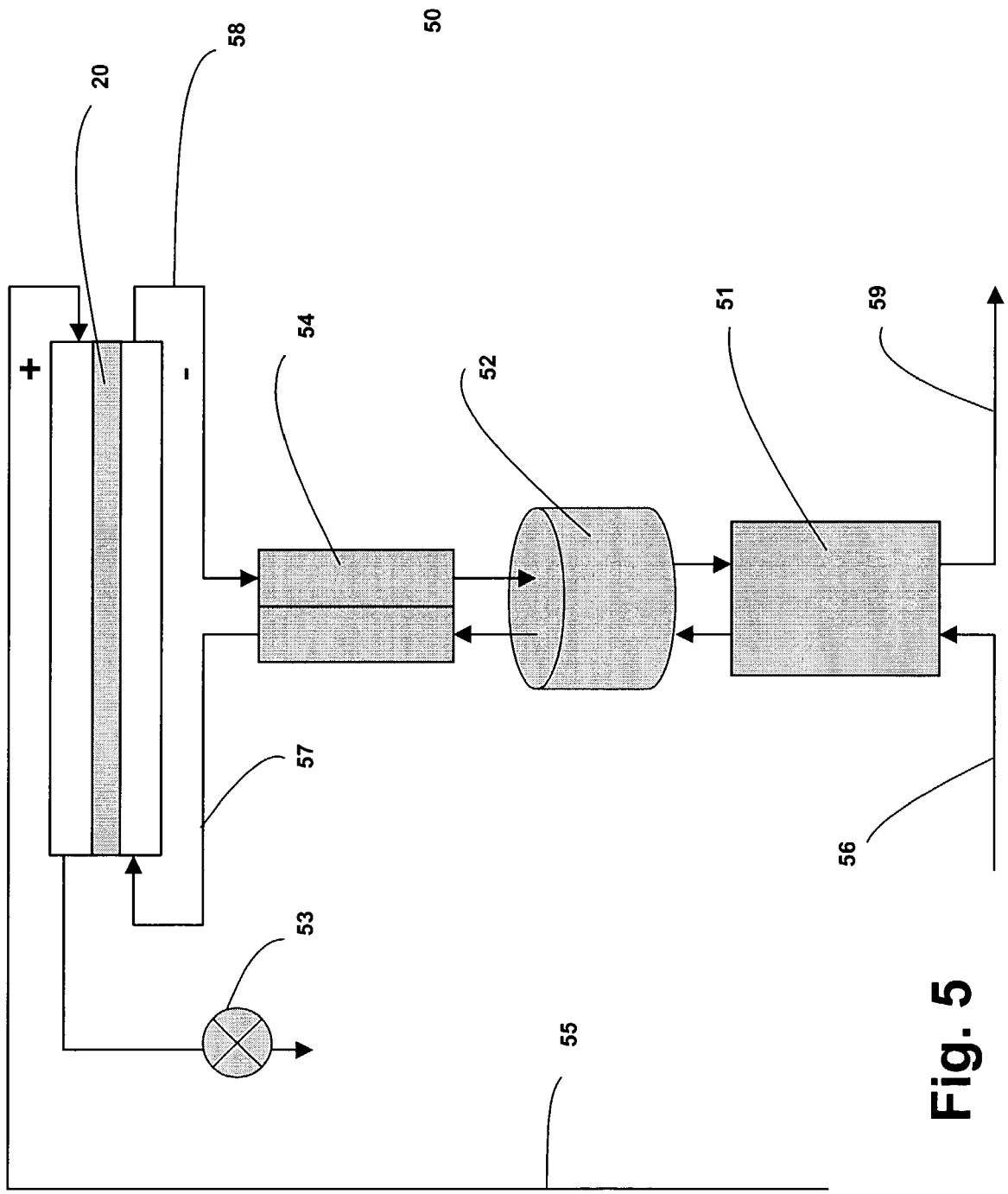
FIG. 5 is a system schematic of the major SORFC components operating in the fuel cell mode, according to a preferred embodiment of the present invention.

The SORFC system 50 of a preferred embodiment operating in a fuel cell mode is shown of FIG. 5 as a simplified schematic. A single SORFC 20 previously shown in FIG. 2 as a cross section operating in the fuel cell mode is shown again on FIG. 5. While a single SORFC is shown, it should be understood that the system 50 contains a plurality of SORFC stacks. A hydrogen recovery unit 51 transfers hydrogen gas from within a first gas mixture stream into a second gas stream. The hydrogen recovery unit 51 can be a device which recovers hydrogen based on absorption/adsorption processes or based on an electrochemical proton exchange process. The electrochemical exchange process is preferred.

An enthalpy recovery unit 52 transfers water vapor from first gas stream to a second gas stream. The enthalpy recovery unit 52 can be a device which transfers water vapor based on cyclic desiccant beds or a rotating desiccant wheel. The desiccant wheel (i.e., "enthalpy wheel") is preferred. Purge valve 53 is a normally closed powered open solenoid valve. A heat exchanger 54 is a counter flow gas-gas heat exchanger. The SORFC power output, such as output electrode(s), is connected to a power distribution system. The oxidizer (i.e., oxygen or air) enters the system 50 through the oxidizer inlet or conduit 55, while the fuel enters the system through the fuel inlet or conduit arrangement 56/57. The fuel exhaust exits through conduit arrangement 58/59.

A method of operating the system 50 in the fuel cell mode is now described. Within the SORFC system 50 shown in FIG. 5, oxidizer, such as pure oxygen reactant gas from an oxygen storage vessel, such as a liquid oxygen tank, or air, is delivered to the cathode chamber of SORFC 20 through inlet conduit 55. If oxygen reactant is highly pure, then it is normally dead headed within the cathode chamber of SORFC 20. However, even the purest of gases will include trace non reactant gas species. As a result the cathode chamber of SORFC 20 must be occasionally purged of these non reactant species. Oxygen purge valve 53 is used to accomplish this purging.

High purity hydrocarbon inlet stream, such as a methane stream, is introduced into the SORFC system 50 from a hydrocarbon storage vessel, such as a tank (not shown for clarity), through conduit 56 into the hydrogen recovery unit 51. Within the hydrogen recovery unit 51 hydrogen, gas is transferred from the fuel exhaust outlet stream in conduit 58 into the methane stream. This hydrogen supports a uniform methane reformation process within the anode chamber of SORFC 20. The methane and hydrogen mixture next is introduced into the enthalpy recovery unit 52, where a portion of the water vapor is transferred from the fuel exhaust outlet stream in conduit 58 into the methane and hydrogen inlet stream. Preferably, the enthalpy recovery unit also transfers heat from the outlet stream to the inlet stream. From the enthalpy recovery unit 52, the methane, hydrogen and water vapor mixture is introduced into the heat exchanger 54, where the gas mixture temperature is increased near to the operational temperature of 600° C. to 1000° C. using the high temperature waste heat from the outlet stream in conduit 58. From heat exchanger 54, the hot mixture of methane, hydrogen, and water vapor is delivered to the anode chamber of SORFC 20 through conduit 57. Some steam reformation of the methane will occur in the heat exchanger 54 and conduit 57 but the amount is suppressed by the existence of the hydrogen. The completion of the steam reforming of the methane is accomplished in the anode chamber of the SORFC 20.

Within the anode chamber of the SORFC 20, the steam reforming of methane and the oxidation of carbon and hydrogen in the fuel cell reactions converts the discharged gas mixture (i.e., fuel exhaust) in conduit 58 to carbon dioxide, additional water vapor, and excess hydrogen. The discharged gas mixture in conduit 58 passes through heat exchanger 54, releasing waste heat, and then through the enthalpy recovery unit 52 to supply a portion of the water vapor to support the input methane reformation. The discharged gas mixture in conduit 58 is then directed to the hydrogen recovery unit 51 where virtually all but trace quantities of the hydrogen is transferred to the inlet methane stream. Using the preferred electrochemical proton exchange process as the hydrogen recovery unit 51, provides an exact measure of the hydrogen content within the discharged gas mixture in conduit 58 which is used to adjust the input methane flow rate. The outlet mixture in conduit 59 from hydrogen recovery unit 51 contains only carbon dioxide and water which are stored separately (not shown).

Figure 6:
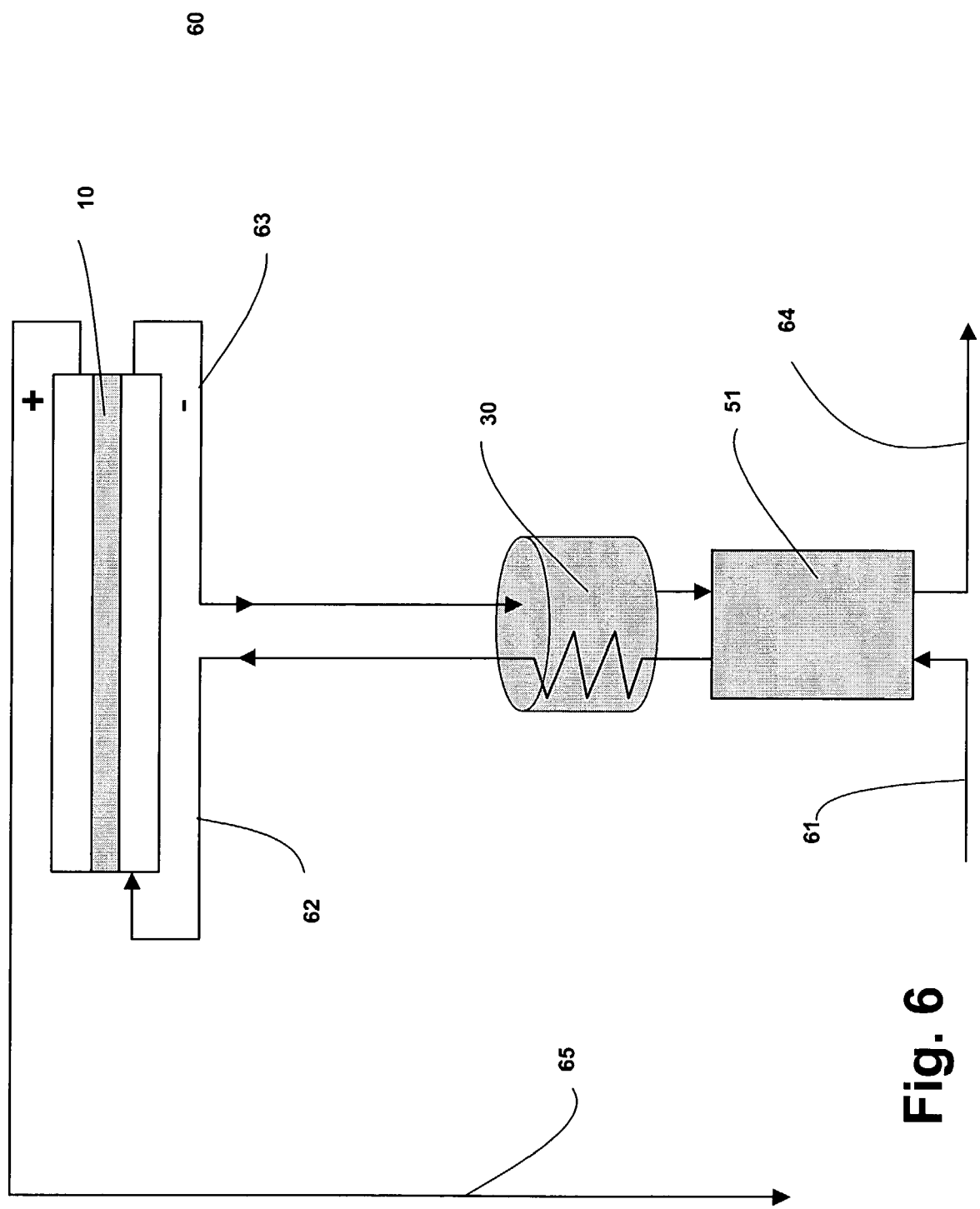
FIG. 6 is a system schematic of the major SORFC components operating in the electrolysis mode, according to a preferred embodiment of the present invention.

The SORFC system 60 of a preferred embodiment operating in an electrolysis mode is shown of FIG. 6 as a simplified schematic. A single SORFC 10 previously shown in FIG. 1 as a cross section operating in the electrolysis mode is shown again in FIG. 6. The hydrogen recovery unit 51 transfers hydrogen gas from within a first gas mixture stream into a second gas stream. The hydrogen recovery unit 51 can be a device which recovers hydrogen based on absorption/adsorption processes or based on an electrochemical proton exchange process. The electrochemical exchange process is preferred.

The Sabatier reactor subsystem 30, described with respect to FIG. 3, converts carbon monoxide and hydrogen into methane and water vapor. Carbon dioxide and water enter the system 60 through inlet or conduit 61, which may be the same or different than conduit 56, shown in FIG. 5. The generated oxygen exits through outlet or conduit 65, while the methane and water exit through outlet or conduit arrangement 63/64. Conduits 63/64 and 65, respectively, may be the same or different conduits as conduits 58/59 and 55, respectively, shown in FIG. 5.

Thus, the system 60 operating in the electrolysis mode is the same system as system 50 operating in the fuel cell mode, except that the inlet and outlet streams are steered through the Sabatier reactor subsystem 30 instead of through the heat exchanger 54 and the enthalpy recovery unit 52, which remains inactive in the electrolysis mode. The inlet and outlet streams may be steered using valves and parallel conduits (not shown for clarity). Furthermore, the electrode designations in the SORFC 10 of system 60 are reversed compared to SORFC 20 of system 50, as explained in detail with respect to FIGS. 1 and 2 above.

A method of operating the system 60 in the electrolysis mode is now described. Carbon dioxide and water are introduced into the SORFC system 60 through conduit 61 into hydrogen recovery unit 51. Carbon dioxide may be introduced from a carbon dioxide storage vessel or from a conduit. Within the hydrogen recovery unit 51, hydrogen gas is transferred from the outlet stream in conduit 63 into the carbon dioxide and water inlet stream. This extra hydrogen eventually assures that all the carbon bearing gases are converted into methane within the Sabatier reactor subsystem 30. The carbon dioxide, water, and hydrogen inlet mixture next is introduced into the Sabatier subsystem 30 heat exchanger where it is heated by the exothermic reaction. From the Sabatier subsystem 30, the carbon dioxide, hydrogen and water vapor mixture is delivered to the cathode chamber of SORFC 10 through conduit 62. Within the cathode chamber of SORFC 10, the carbon dioxide and water vapor are reduced by electrolysis to carbon monoxide and hydrogen. Excess water and some unreacted carbon dioxide will be discharged from the cathode chamber of SORFC 10 along with the carbon monoxide and hydrogen through conduit 63.

The discharged gas mixture in conduit 63 passes through the Sabatier subsystem 30 to convert all the carbon oxides to methane and water with the excess hydrogen. The discharged gas mixture in conduit 63 is then directed to the hydrogen recovery unit 51 wherein virtually all but trace quantities of the hydrogen is transferred to the inlet carbon dioxide and water stream. Using the preferred electrochemical proton exchange process as the hydrogen recovery unit 51, provides an exact measure of the hydrogen content within the discharged gas mixture in conduit 63 which is used to adjust the input carbon dioxide flow rate. The outlet mixture in conduit 64 from hydrogen recovery unit 51 contains only methane and water which are stored separately (not shown).

In the meantime, pure oxygen gas is generated in the SORFC 10 anode during the electrolysis process. The oxygen is discharged from the SORFC 10 anode through conduit 65 and on to discharge, direct metabolic use and/or to liquefied storage (not shown).

The Sabatier reactor which generates methane is advantageous because it operates at a temperature of about 900 degrees, which is a suitable temperature for heating the inlet stream being provided into the SORFC to or near to a desired SORFC operating temperature. However, other reactors which generate hydrocarbon gases other than methane may be used instead of the Sabatier reactor.

For example, reactors which convert an exhaust gas which contains hydrogen and carbon oxides, such as carbon monoxide and/or carbon dioxide, and optionally water, to methanol may be used instead. The methanol reactors typically, but not necessarily, contain a copper catalyst which converts hydrogen, carbon oxides and/or water vapor to methanol. These reactors may be catalyst bed type reactors, such as ARC reactors, quench converters, tube cooled converters, isothermal reactors where a continuous catalyst bed surrounds a spiral wound heat exchanger, and other suitable reactor types.

The following exothermic reactions are involved in the synthesis of methanol: $CO+2H_2=CH_3OH$; $CO_2+3H_2=CH_3OH$ and $CO+H_2O=CO_2+H_2$. The use of a SORFC operating in the electrolysis mode to generate methanol is advantageous because the SORFC exhaust gas contains a similar composition to synthesis gas that is used as a source gas for methanol production. The synthesis gas is usually specially prepared in a separate catalytic steam reforming of natural gas in conventional methanol synthesis process.

If desired, additional reactors may be present downstream of the Sabatier or methanol reactors to further purify the methane or methanol if desired. Alternatively, the additional reactors may be used to convert methane or methanol to other hydrocarbon gases, such as ethane, propane, octane, formic acid, formaldehyde and/or other suitable hydrocarbon gases. These hydrocarbon gases may be used as a fuel for the SORFC in the fuel cell mode and/or may be removed from the SORFC system for other use, sale or storage. Thus, the SORFC system may be used to generate various hydrocarbon fuels for storage or sale when the system is not generating power in the fuel cell mode. Alternatively, suitable reactors may be used to convert the hydrogen and carbon oxide containing SORFC electrolysis mode exhaust to the other hydrocarbon gases, such as ethane, propane, octane, formic acid, formaldehyde and/or other suitable hydrocarbon gases.

If desired, the SORFC system 50/60 may also include other components, such as a renewable energy source, such as a solar cell or a wind turbine electrically connected to the SORFC. The SORFC is adapted to generate power in a fuel cell mode from the regenerated fuel when the renewable energy source is not generating power, such as when there is no wind (i.e., on a calm day) or no sun (i.e., on a cloudy day or at night). The renewable energy source may be used to provide power to the SORFC in the electrolysis mode. Therefore, the system may provide continuous power without a regular delivery or resupply of fuel.

In another alternative embodiment of the present invention, the SORFC system 50/60 is used for peak shaving. In peak shaving, power is provided to the SORFC from an external power source when power demand on the external power source is below a predetermined amount. At this time, the SORFC is operated in an electrolysis mode using the power provided from the external power source. In contrast, when power demand on the external power source is above the predetermined amount or when the external power source experiences a power disruption, the SORFC is operated in a fuel cell mode and power is provided from the SORFC operating in the fuel cell mode to the external power source.

Preferably, the SORFC system(s) described above is used in a terrestrial location (i.e.. on Earth, under water, under ground or in Earth orbit, but not in outer space or on another planet). The SORFC systems described herein may have other embodiments and configurations, as desired. Other components, such as fuel side exhaust stream condensers, heat exchangers, heat-driven heat pumps, turbines, additional gas separation devices, hydrogen separators which separate hydrogen from the fuel exhaust and provide hydrogen for external use, fuel preprocessing subsystems, fuel reformers and/or water-gas shift reactors, may be added if desired, as described, for example, in U.S. application Ser. No. 10/300,021, filed on Nov. 20, 2002, in U.S. Provisional Application Ser. No. 60/461,190, filed on Apr. 9, 2003, and in U.S. application Ser. No. 10/446,704, filed on May 29, 2003 all incorporated herein by reference in their entirety.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A method of operating a terrestrial solid oxide regenerative fuel cell system comprising:
   operating the solid oxide regenerative fuel cell system in a fuel cell mode to generate power; and
   operating the solid oxide regenerative fuel cell system in an electrolysis mode to generate oxygen and a hydrocarbon fuel;
   wherein:
   the step of operating the solid oxide regenerative fuel cell system in the electrolysis mode comprises providing power, carbon dioxide and water vapor to the solid oxide regenerative fuel cell and generating the oxygen and the hydrocarbon fuel;
   the step of operating the solid oxide regenerative fuel cell system in the fuel cell mode comprises providing oxidizer and the hydrocarbon fuel to the solid oxide regenerative fuel cell and releasing carbon dioxide and water vapor from the solid oxide regenerative fuel cell;
   the hydrocarbon fuel comprises methane; and
   the step of generating the oxygen and the hydrocarbon fuel comprises:
   providing hydrogen and carbon monoxide emitted from the solid oxide regenerative fuel cell into a Sabatier reactor; and
   converting the hydrogen and carbon monoxide to methane and water vapor in the Sabatier reactor.

2. The method of claim 1, wherein the step of converting the hydrogen and carbon monoxide to methane and water vapor in the Sabatier reactor produces a quantity of waste heat that is substantially equivalent to a heat deficiency resulting from a methane reforming reaction in the solid oxide regenerative fuel cell during the fuel cell mode.

3. The method of claim 1, further comprising:
storing the hydrocarbon fuel generated in the electrolysis mode; and
providing the stored hydrocarbon fuel into the solid oxide regenerative fuel cell when the solid oxide regenerative fuel cell operates in the fuel cell mode.

4. The method of claim 1, further comprises removing the hydrocarbon fuel generated in the electrolysis mode from a solid oxide regenerative fuel cell system.

5. The method of claim 1, further comprising:
providing an inlet gas stream into the solid oxide regenerative fuel cell;
providing an exhaust gas stream from the solid oxide regenerative fuel cell into a reactor;
converting the exhaust gas stream emitted from the solid oxide regenerative fuel cell to a hydrocarbon gas in an exothermic reaction; and
transferring heat from an exothermic reaction to the inlet gas stream.

6. A method of operating a terrestrial solid oxide regenerative fuel cell system, comprising:
providing an inlet gas stream into a solid oxide regenerative fuel cell operating in an electrolysis mode;
providing an exhaust gas stream from the solid oxide regenerative fuel cell into a reactor;
converting the exhaust gas stream emitted from the solid oxide regenerative fuel cell to a hydrocarbon gas in an exothermic reaction;
transferring heat from an exothermic reaction to the inlet gas stream; and
further comprising operating the solid oxide regenerative fuel cell in a fuel cell mode to generate power;
wherein:
the step of operating the solid oxide regenerative fuel cell in the electrolysis mode comprises providing power, carbon dioxide and water vapor to the solid oxide regenerative fuel cell and generating the oxygen and the hydrocarbon gas in the reactor;
the step of operating the solid oxide regenerative fuel cell in the fuel cell mode comprises providing oxidizer and a hydrocarbon fuel to the fuel cell and releasing carbon dioxide and water vapor from the solid oxide regenerative fuel cell;
the hydrocarbon fuel comprises methane;
the step of providing the exhaust gas stream from the solid oxide regenerative fuel cell into a reactor comprises providing hydrogen and carbon monoxide emitted from the solid oxide regenerative fuel cell into a Sabatier reactor;
the step of converting the exhaust gas emitted from the solid oxide regenerative fuel cell to a hydrocarbon gas in an exothermic reaction comprises converting the hydrogen and carbon monoxide to methane and water vapor in the Sabatier reactor; and
the step of transferring heat from an exothermic reaction to the inlet gas stream comprises passing the inlet gas stream through a heat exchanger located in a Sabatier reactor subsystem.

7. The method of claim 6, wherein the step of converting the hydrogen and carbon monoxide to methane and water vapor in the Sabatier reactor produces a quantity of waste heat that is substantially equivalent to a heat deficiency resulting from a methane reforming reaction in the solid oxide regenerative fuel cell during the fuel cell mode.

8. The method of claim 7, wherein the solid oxide regenerative fuel cell and the Sabatier reactor are operated to sustain the solid oxide regenerative fuel cell at a desired operating temperature by heat transfer from the Sabatier reactor to the solid oxide regenerative fuel cell without generating excess heat in the Sabatier reactor.

9. The method of claim 6, further comprising:
storing the hydrocarbon gas generated in the electrolysis mode; and
providing the stored hydrocarbon gas as a fuel into the solid oxide regenerative fuel cell when the solid oxide regenerative fuel cell operates in the fuel cell mode.

10. The method of claim 6, further comprises removing the hydrocarbon gas generated in the electrolysis mode from a solid oxide regenerative fuel cell system.

11. The method of claim 6 wherein a complete electrolysis reaction resulting in a formation of the hydrocarbon gas is a net exothermic electrolysis reaction.

12. The method of claim 11, wherein no heat storage material is used to provide heat recovered during a fuel cell mode to the solid oxide regenerative fuel cell operating in the electrolysis mode.

13. The method of claim 12, wherein no external heat is provided to the solid oxide regenerative fuel cell operating in the electrolysis mode.

* * * * *